3,460,851
ARRANGEMENT FOR THE EQUALIZATION OF LOADS OF TWO REAR AXLES IN VEHICLES, ESPECIALLY COMMERCIAL-TYPE MOTOR VEHICLES

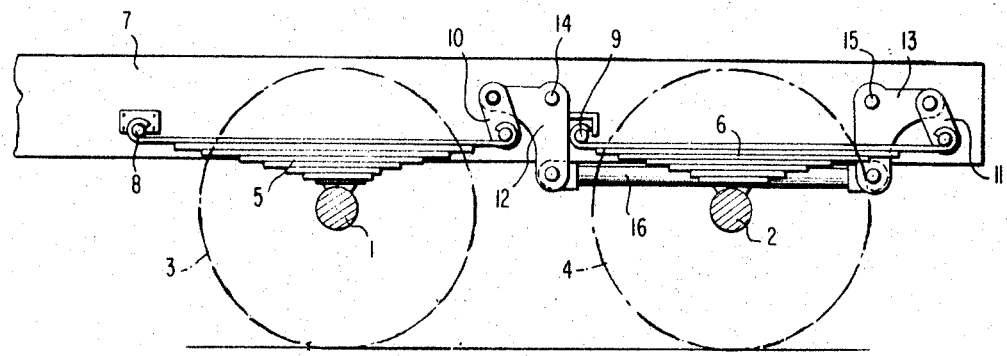

Hermann Schrimpf, Sulzbach, Germany, assignor to Daimler-Benz Aktiengesellschaft, Stuttgart-Unterturkheim, Germany
Filed May 8, 1967, Ser. No. 636,722
Claims priority, application Germany, May 10, 1966, D 50,076
Int. Cl. B60g 5/00
U.S. Cl. 280—104.5                  2 Claims

ABSTRACT OF THE DISCLOSURE

An installation for the equalization of the loads of two rear axles in vehicles, especially commercial-type motor vehicles, in which each of the two rear axles provided on each side is spring-supported with respect to the vehicle frame by means of a leaf spring whose forward end is pivotally secured to the vehicle frame while its rear end is pivotally connected by way of a shackle with a substantially horizontal leg portion of a bell crank pivotally mounted at the vehicle frame; the other leg portion of each of the two bell cranks on each side which extend downwardly are interconnected by way of a linkage and the pivot point of the rear bell crank is located forwardly of the rear end of the corresponding rear leaf spring.

Background of the invention

The present invention relates to an arrangement for the equalization of the load between two rear axles of vehicles, especially commercial-type motor vehicles.

Installations for the equalization of the loads of two axles are known in the prior art in connection with commercial-type motor vehicles having two rear axles, which include two bell-cranks on each side of the vehicle that are rotatably supported at their center points of rotation at the vehicle frame or chassis, and whose one leg is pivotally connected by way of a shackle with the rear eye of the corresponding leaf spring whereas the other legs of the two bell cranks are interconnected by a linkage.

A particularly favorable transmission of the brake force of all rear wheels onto the road as well as an even tire wear is achieved with such types of installations for the axle pressure equalization.

The hitherto known installations for the equalization of the loads of two rear axles, however, entail the disadvantage that the parts of the bell-cranks and of the connecting linkage project beyond the top edge of the vehicle frame or chassis. As a result thereof, recesses or bulges are necessary in the bodies assembled on the frame or chasis which render more costly the manufacture of the bodies and interrupt smooth or flush loading surfaces. Furthermore, unfavorable with such types of prior art constructions is the fact that the parts of the equalization installation protruding beyond the top edge of the vehicle frame are covered by the body so that they are accessible only with difficulty for servicing or exchange thereof.

Summary of the invention

Accordingly, it is proposed in accordance with the present invention for the avoidance of these disadvantages with an installation for the equalization of the loads of two rear axles, which includes on each side of the vehicle two bell-cranks that are rotatably supported in their center of rotation on the vehicle frame and to whose one leg is connected by way of a shackle the rear eye of a corresponding leaf spring whereas the other legs of the two bell cranks are interconnected by a linkage, to locate the center of rotation of the bell crank which is disposed rearwardly as viewed in the driving direction, in front of the rear eye of the rear leaf spring and to cause the linkage to engage with downwardly directed legs of the two bell cranks.

Accordingly, it is an object of the present invention to provide a load equalization installation for two rear axles of vehicles, especially commercial-type vehicles, which is simple in construction, yet avoids the aforementioned shortcomings and drawbacks encountered with the prior art constructions.

Another object of the present invention resides in a load equalization installaion for the rear axles of vehicles which can be accommodated completely within the space disposed below the top edge of the vehicle frame.

A further object of the present invention resides in an installation for the equalization of the loads of two rear axles in vehicles which minimizes the cost of manufacture by avoiding expensive recesses or bulged portions in the vehicle body to accommodate the installation.

A still further object of the present invention resides in a load equalization system of the type described above which permits ready accessibility for servicing or exchange of the parts.

Still another object of the present invention resides in a load equalization installation for the two rear axles of motor vehicles, especially commercial-type motor vehicles which avoids the interruption of smooth loading surfaces of the vehicle.

These and other objects, features, and advantages of the present invention will become more obvious from the following description when taken in connection with the accompanying drawing which shows, for purposes of illustration only, one embodiment in accordance with the present invention, and wherein:

The single figure is a side elevational view of a load equalizaation installation for the rear axles of vehicles in accordance with the present invention, in which the wheels of the vehicle are indicated only in dash line for the sake of clarity.

Referring now to the single figure of the drawing, reference numerals 1 and 2 indicate the axles of the rear wheels 3 and 4, respectively, which are spring-supported with respect to the vehicle frame 7 of any conventional construction by means of leaf springs 5 and 6. The forward eyes of the leaf springs 5 and 6, i.e., those which are disposed forwardly as viewed in the driving direction, are supported at the vehicle frame at 8 and 9 in any conventional manner. The rear eyes of the leaf springs 5 and 6 are pivotally connected by way of shackles 10 and 11 to bell-cranks 12 and 13, respectively. The bell-cranks 12 and 13 are rotatably supported in their center points of rotation 14 and 15 at the vehicle frame 7. The downwardly pointing legs of the bell-cranks 12 and 13 are interconnected by means of a linkage 16.

The bell-crank 13 is thereby so arranged that its center point of rotation 15 lies, as viewed in the driving direction, in front of the rear eye of the rear leaf spring 6.

The significant advantage is obtained with the present invention, in particular for semi-trailers, that the rear overhang of the vehicle frame 7 can be reduced by about 300 mm.

There is achieved with the equalization installation according to the present invention, compared to the hitherto known installations of this type and with the same constructional and manufacturing expenditures that no parts of the equalization installation project beyond the top edge of the vehicle frame so that no matching or adaptation of the vehicle body to the equalization installation becomes necessary.

While I have shown and described only one embodiment in accordance with the present invention, it is understood that the same is not limited thereto, but is susceptible of numerous changes and modifications as known to a person skilled in the art, and I therefore do not wish to be limited to the details shown and described herein.

I claim:

1. A load equalization system for the two rear axles of a vehicle having a frame and provided on each side with two longitudinally extending, with respect to the driving direction, leaf springs being mounted above and respectively supporting each axle, means pivotally mounting the forward end of each leaf spring on the frame, two bell-cranks each pivotally mounted on the frame and having two legs, a shackle connected to one leg of each bell-crank and the rear of each leaf spring, respectively, and a linkage pivotally connecting the other legs of the two bell-cranks, wherein the improvement comprises for each side, the pivotal mounting to the frame of the rearmost bell-crank being longitudinally spaced in front of the rear pivotal connection of the rear leaf spring to its shackle, and said other legs of the two bell-cranks extending downwardly from the pivotal frame connection of their respective bell-cranks.

2. The installation according to claim 1, wherein the legs of each bell-crank that are connected to the shackles extend in opposite directions with respect to each other from their respective pivotal frame connections so that the vertical component of force exerted on the bell-cranks by the leaf springs produce only tension forces in said linkage.

References Cited

UNITED STATES PATENTS 2,225,016  12/1940  Mallett _____ 280—104.5

OTHER REFERENCES

Automobile Engineer, April 1952, vol. 42, p. 146.

PHILIP GOODMAN, Primary Examiner